(12) United States Patent
Lee et al.

(10) Patent No.: US 11,162,687 B2
(45) Date of Patent: Nov. 2, 2021

(54) PLANAR HEATING APPARATUS AND HEATING DEVICE INCLUDING THE SAME

(71) Applicant: Samsung Electronics Co., Ltd., Suwon-si (KR)

(72) Inventors: Changsoo Lee, Seoul (KR); Doyoon Kim, Hwaseong-si (KR); Hajin Kim, Hwaseong-si (KR); Haengdeog Koh, Hwaseong-si (KR); Seyun Kim, Seoul (KR); Jinhong Kim, Seoul (KR); Taehun Kim, Seongnam-si (KR); Soichiro Mizusaki, Suwon-si (KR); Minjong Bae, Yongin-si (KR); Hiesang Sohn, Seoul (KR); Kunwoo Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 981 days.

(21) Appl. No.: 15/633,832

(22) Filed: Jun. 27, 2017

(65) Prior Publication Data

US 2018/0163969 A1 Jun. 14, 2018

(30) Foreign Application Priority Data

Dec. 12, 2016 (KR) .......................... 10-2016-0168716

(51) Int. Cl.
*F24C 7/06* (2006.01)
*F24C 15/00* (2006.01)
(Continued)

(52) U.S. Cl.
CPC ........... *F24C 7/062* (2013.01); *A47J 37/0629* (2013.01); *F24C 7/046* (2013.01); *F24C 7/067* (2013.01);
(Continued)

(58) Field of Classification Search
CPC .......... F24C 7/062; F24C 7/046; F24C 7/067; F24C 15/007; A47J 37/0629; H05B 3/08; H05B 3/145; H05B 3/26; H05B 3/62; H05B 2203/002; H05B 2214/02
USPC ................. 219/402–404, 406–411, 417–418, 219/422–424, 427, 465.1, 466.1, 467.1, 219/468.1, 468.2, 474–478, 522–523, 219/539, 520, 543
See application file for complete search history.

(56) References Cited

U.S. PATENT DOCUMENTS 3,805,023 A * 4/1974 Wainer ..................... C25D 5/02
219/543
8,592,726 B2 * 11/2013 Tsuruya ............. G03G 15/2028
219/216
(Continued)

FOREIGN PATENT DOCUMENTS

| JP | 2002216938 A | 8/2002 |
| JP | 3950728 B2 | 4/2007 |
| JP | 4311997 B2 | 5/2009 |

*Primary Examiner* — Tu B Hoang
*Assistant Examiner* — Diallo I Duniver
(74) *Attorney, Agent, or Firm* — Cantor Colburn LLP

(57) ABSTRACT

A planar heating apparatus includes a substrate, first electrodes on the substrate, second electrodes alternately arranged with the first electrodes, an electrode connector connecting end portions of the first or second electrodes to each other and a power connector connected to the electrode connector and to which a power supply is connected. The power connector extends outside of the substrate.

5 Claims, 6 Drawing Sheets

(51) Int. Cl.

| | |
|---|---|
| *A47J 37/06* | (2006.01) |
| *H05B 3/26* | (2006.01) |
| *H05B 3/08* | (2006.01) |
| *F24C 7/04* | (2021.01) |
| *H05B 3/14* | (2006.01) |
| *H05B 3/62* | (2006.01) |

(52) U.S. Cl.
CPC .............. *F24C 15/007* (2013.01); *H05B 3/08* (2013.01); *H05B 3/145* (2013.01); *H05B 3/26* (2013.01); *H05B 3/62* (2013.01); *H05B 2203/002* (2013.01); *H05B 2214/02* (2013.01)

(56) References Cited

U.S. PATENT DOCUMENTS

| 8,791,394 | B2* | 7/2014 | Han | H05B 3/84 |
| | | | | 219/202 |
| 2006/0138123 | A1* | 6/2006 | Ishii | H01C 17/06586 |
| | | | | 219/549 |
| 2007/0193996 | A1* | 8/2007 | Nakajima | H05B 3/26 |
| | | | | 219/209 |
| 2016/0192446 | A1 | 6/2016 | Seddik | |

* cited by examiner

PLANAR HEATING APPARATUS AND HEATING DEVICE INCLUDING THE SAME

CROSS-REFERENCE TO RELATED APPLICATION

This application claims priority to Korean Patent Application No. 10-2016-0168716, filed on Dec. 12, 2016, and all the benefits accruing therefrom under 35 U.S.C. § 119, the content of which in its entirety is herein incorporated by reference.

BACKGROUND

1. Field

The present disclosure relates to a planar heating apparatus and a heating device such as an electric oven including the same, and more particularly, to an electric oven including a planar heating apparatus that uniformly increases a temperature of an inside of a cavity.

2. Description of the Related Art

Conventional planar heating apparatuses that operate by receiving electricity do not pollute the environment since they do not contaminate the air. Thus, these conventional planar heating apparatuses are widely used in residential heating devices and cooking heating devices in apartments or detached houses that require heating since they can be easily used to control the indoor temperature and produce no noise.

SUMMARY

Provided are planar heating apparatuses including substrates and connectors which are outside the substrates, and heating devices such as electric ovens including the planar heating apparatuses.

Additional features will be set forth in part in the description which follows and, in part, will be apparent from the description, or may be learned by practice of the presented embodiments.

According to an embodiment, a planar heating apparatus includes: a substrate; a plurality of first electrodes arranged on the substrate and spaced apart from each other; a plurality of second electrodes arranged on the substrate and spaced apart from each other to alternate with the plurality of first electrodes; a plurality of heating layers arranged on the substrate respectively between a first electrode and a second electrode; a first connector including a first electrode connector connecting an end portion of each of the plurality of first electrodes to each other, and a first power connector connected to the first electrode connector and extending outside the substrate; and a second connector including a second electrode connector connecting an end portion of each of the plurality of second electrodes to each other, and a second power connector connected to the second electrode connector and extending outside the substrate.

The planar heating apparatus may further include: a first support bracket connected to the substrate and on which the first power connector is disposed, such first support bracket extending outside the substrate; and a second support bracket connected to the substrate and on which the second power connector is disposed, such second support bracket extending outside the substrate.

The first bracket may define a first through hole at a distal end thereof into which a first connector is inserted to connect a power supply to the first power connector, and the second bracket may define a second through hole at a distal end thereof into which a second connector is inserted to connect the power supply to the second power connector.

The plurality of heating layers may include one of a carbon nano tube ("CNT") and a conductive oxide layer. The conductive oxide layer may include at least one of $RuO_2$, $MnO_2$, $VO_2$, $TaO_2$, $IrO_2$, $NbO_2$, $WO_2$, $GaO_2$, $MoO_2$, $InO_2$, $CrO_2$, and $RhO_2$.

The plurality of first electrodes, the first electrode connector and the first power connector may be integrally formed.

The plurality of second electrodes, the second electrode connector and the second power connector may be integrally formed.

The power from the first and second power connectors generates heat in the plurality of heating layers to heat the planar heating apparatus at a high temperature of about 600° C.

According to another embodiment, an electric oven includes: a cavity defined by a top plate, a bottom plate, two side plates and a rear plate each of which defines a plate surface thereof opposite to the cavity, the cavity having an open front; a door with which the cavity is opened and closed; and a planar heating apparatus which generates heat, such planar heating apparatus disposed on the plate surface to radiantly apply the generated heat to the cavity. The planar heating apparatus includes: a first electrode on the plate surface; a second electrode on the plate surface to be spaced apart from the first electrode; a heating layer on the plate surface between the first electrode and the second electrode spaced apart from each other; a first power connector connected to the first electrode and to which a power is applied, the first power connector on the plate surface, such first power connector extending from the plate surface to outside edges of the plate surface; and a second power connector connected to the second electrode and to which the power is applied, the second power connector on the plate surface, such second power connector extending from the plate surface to outside the edges of the plate surface.

The first electrode may be provided in plurality spaced apart from each other, the second electrode may be provided in plurality spaced apart from each other to alternate with the plurality of first electrodes, and the heating layer may be provided in plurality to be respectively arranged between one of the plurality of first electrodes and one of the plurality of second electrodes.

The electric oven may further include: a first electrode connector which connects an end portion of each of the plurality of first electrodes to each other and a second electrode which connects an end portion of each of the plurality of second electrodes to each other. The first electrode connector may be connected to the first power connector, and the second electrode connector may be connected to the second power connector.

The electric oven may further include: a first support bracket connected to the plate surface and on which the first power connector is disposed, such first support bracket extending outside the edges of the plate surface; and a second support bracket connected to the plate surface and on which the second power connector is disposed, such second support bracket extending outside the edges of the plate surface.

The first bracket may define a first through hole at a distal end thereof into which a first connector is inserted to connect a power supply to the first power connector, and the second bracket may define a second through hole at a distal end thereof into which a second connector is inserted to connect the power supply to the second power connector.

The first power connector may define a distal end thereof which is spaced apart from the first through hole of the first support bracket and to which a first connection bridge is connected to connect the first power connector to the first connector inserted in the first through hole, and the second power connector may define a distal end thereof which is spaced apart from the second through hole of the second support bracket and to which a second connection bridge is connected to connect the second power connector to the second connector inserted in the second through hole.

The electric oven may further include: an electrical insulating layer which defines the plate surface.

The power from the first and second power connectors generates heat in the heating layer to heat the planar heating apparatus at a temperature of about 600° C.

The plurality of first electrodes, the first electrode connector, and the first power connector may be integrally formed.

The plurality of second electrodes, the second electrode connector, and the second power connector may be integrally formed.

The heating layer may include one of a carbon nano tube ("CNT") and a conductive oxide layer. The conductive oxide layer may include at least one of $RuO_2$, $MnO_2$, $VO_2$, $TaO_2$, $IrO_2$, $NbO_2$, $WO_2$, $GaO_2$, $MoO_2$, $InO_2$, $CrO_2$ and $RhO_2$.

The electric oven may further include: a casing surrounding the cavity; and an insulating member interposed between the casing and the planar heating apparatus.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
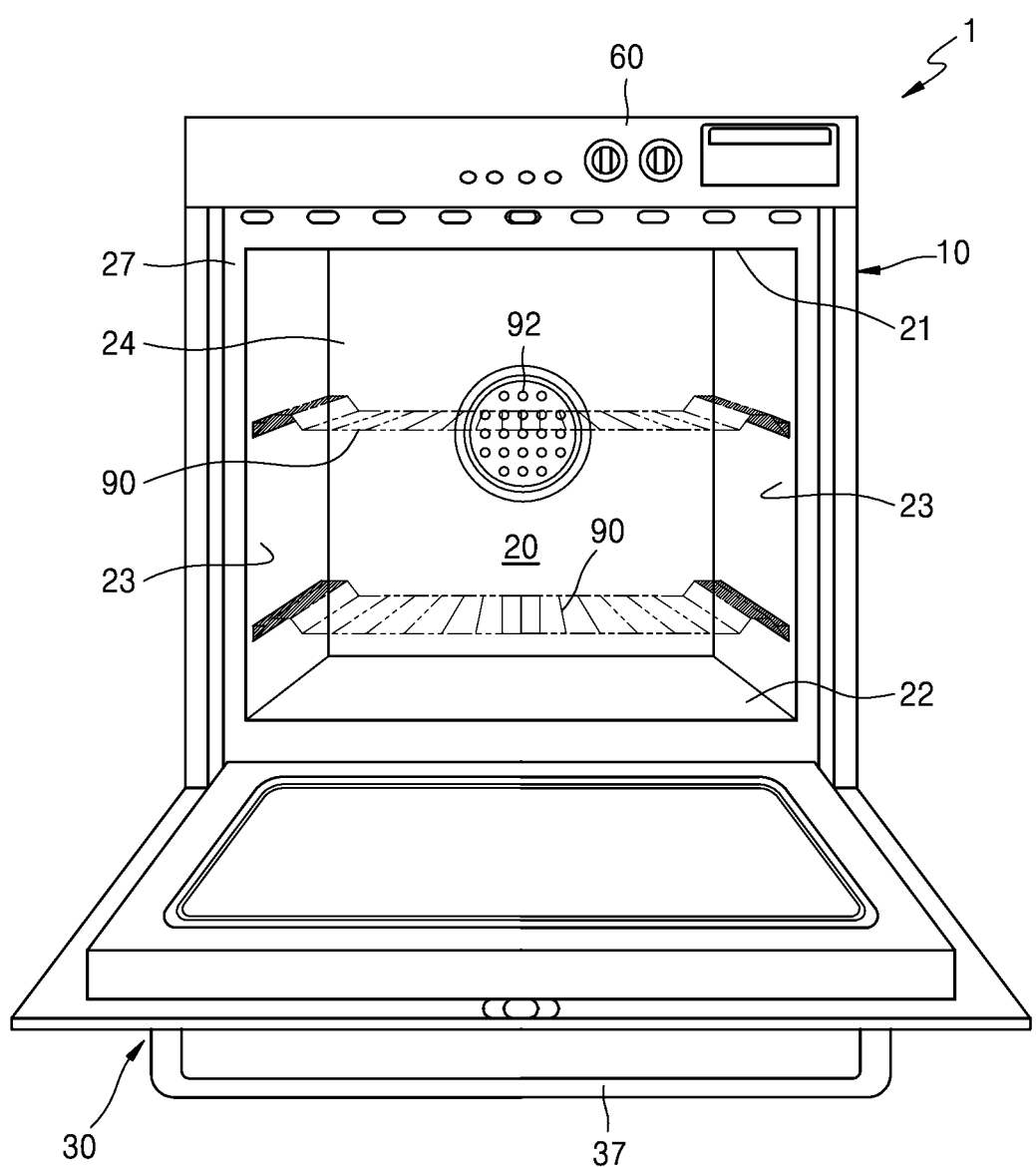
FIG. 1 is a perspective front view of an electric oven according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain features.

Expressions such as "at least one of," when preceding a list of elements, modify the entire list of elements and do not modify the individual elements of the list.

Throughout the specification, it will be understood that when a unit is referred to as being related to another element such as being "connected" or "on" another element, it can be directly on the other element or intervening elements may be present therebetween. In contrast, when an element is referred to as being related to another element such as being "directly connected" or "directly on" another element, there are no intervening elements present. When a unit is referred to as being related to another element such as being "electrically connected," it can be directly connected to the other element or intervening elements may be present therebetween.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, it will be understood that when a unit is referred to as "comprising" another element, it does not preclude the possibility that one or more other elements may exist or may be added.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Heating devices in which an object is heated, such as electric ovens which are one category of cooking heating devices, use electric heaters as a heating source. In this regard, a planar heating apparatus may be used as an electric heater within such heating device. The planar heating apparatus may be arranged at one side portion inside a cavity in an electric oven and may apply heat to the cavity so as to heat an object such as food by natural convection or forced convection. However, when a plurality of planar heating apparatuses are provided in an electric oven as electric heaters, there is a problem in placing planar heating apparatuses together with an electric structure outside a relatively high temperature cavity.

Figure 2:
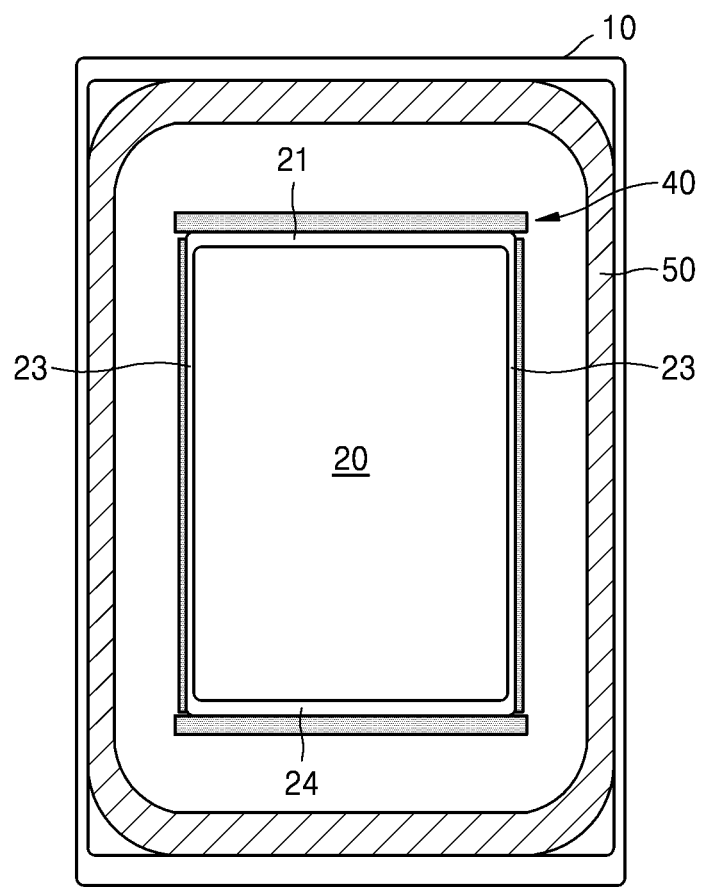
FIG. 2 is a front cross-sectional view of an electric oven according to an example embodiment.

FIG. 1 is a front perspective view of an electric oven 1 as a heating device according to an example embodiment. FIG. 2 is a front cross-sectional view of the electric oven 1 according to an example embodiment.

The electric oven 1 may include a casing 10 and a cavity 20 which is defined or provided inside the casing 10. The casing 10 may form an outer surface of the overall electric oven 1. The electric oven 1 has or defines a front opening. Portions of the casing 10 may define the front opening. The cavity 20 in the casing 10 may be accessed via the front opening. The electric oven 1 may include a closing element such as a door 30. The door 30 may be rotatably coupled to a side of the casing 10 so as to provide access to the cavity 20 via the front opening in an open state of the door 30 and to restrict/block access to the cavity 20 via the front opening in a closed state of the door 30.

The cavity 20 may be a cooking space for which boundaries are defined or formed by a top plate 21, a bottom plate 22, two side plates 23 and a rear plate 24. A front plate 27 may be provided at a front of the cavity 20 to form the front opening. Various parts or elements constituting the electric oven 1 may be embedded in a space provided between the cavity 20 and the casing 10.

At least one rack 90 may be arranged inside the cavity 20. An object to be heated such as food is placed on the rack 90. A rail (not shown) may be installed in plurality respective on inner surfaces of the opposing two side plates 23. A same rack 90 may be supported on and moved along a pair of rails. A user may place food on the rack 90 or remove food from the rack 90 by moving the rack 90 along the rails to protrude the rack 90 outside the front opening from the cavity 20 or place the rack 90 completely within the cavity 20.

The door 30 may be hingedly coupled to a lower portion of the casing 10 such that the user may open/close the cavity 20. A handling element such as a handle 37 may be attached to an upper portion of the door 30 in order for the user to conveniently rotate the door 30 about a hinged axis thereof.

A vent 92 may be installed at or in the rear plate 24 in order for air inside the cavity 20 to be discharged to outside the cavity 20 and/or the oven 1. The vent 92 may be formed to extend completely through the rear plate 24 in order for the air inside the cavity 20 to pass therethrough. A filter (not shown) may be installed in the vent 92 to filter contamination materials from the air which is discharged from the cavity 20 to outside.

The front cross-sectional view of the electric oven 1 in FIG. 2 illustrates a space provided between the cavity 20 and the casing 10. A planar heating apparatus 40 may be disposed in the space provided between the cavity 20 and the casing 10. A planar heating member may collectively include one or more of the planar heating apparatus 40 where the planar heating member is disposed to face one of the top plate 21, the bottom plate 22, the two side plates 23 and the rear plate 24 which form the cavity 20. The planar heating member may generate heat so as to be heated at a relatively high temperature such as a temperature of about 600° C. The planar heating member which generates heat allows the planar heating apparatus 40 disposed on a cavity-defining plate to radiantly apply the generated heat to the cavity 20.

In an exemplary embodiment, for example, the planar heating member may include five planar heating apparatuses 40 respectively facing the top plate 21, the bottom plate 22, the two side plates 23 and the rear plate 24 that form the cavity 20. The front cross-sectional view of the electric oven 1 in FIG. 2 illustrates the planar heating apparatuses 40 at the top plate 21, the bottom plate 22 and the two side plates 23. The fifth planar heating apparatus 40 is not visible in the view of FIG. 2 since it is disposed behind the rear plate 24 (refer to FIG. 1). As described above, the planar heating apparatuses 40 each generating heat being disposed at multiple surfaces which form the cavity 20 such as being disposed at the top plate 21, the bottom plate 22, the two side plates 23 and the rear plate 24 that form the cavity 20, not only increase a heating rate inside of the cavity 20 but also generate a uniform temperature rise inside of the cavity 20.

In order to insulate the cavity 20 from the outside thereof, an insulating member 50 may be respectively interposed between the top plate 21, the bottom plate 22 and the two side plates 23 that are included in the cavity 20, and the casing 10. A control panel 60 may be installed at an upper portion of the casing 10 to control operation of the electric oven 1.

A structure of the planar heating apparatus 40 arranged outside the cavity 20 used as an electric heater will now be described in more detail below.

Figure 3:
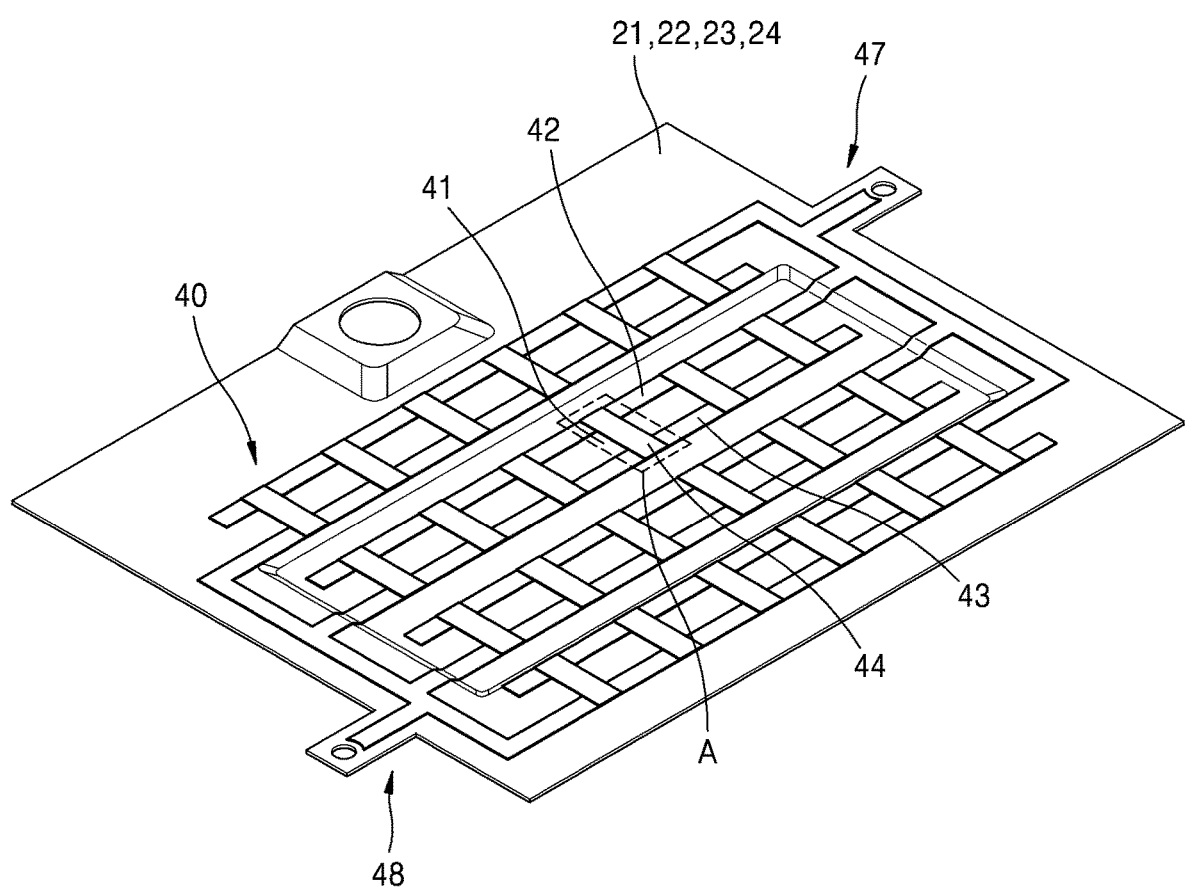
FIG. 3 is a perspective view of a surface of a plate which forms a cavity of the electric oven according to an example embodiment.
Figure 4A:
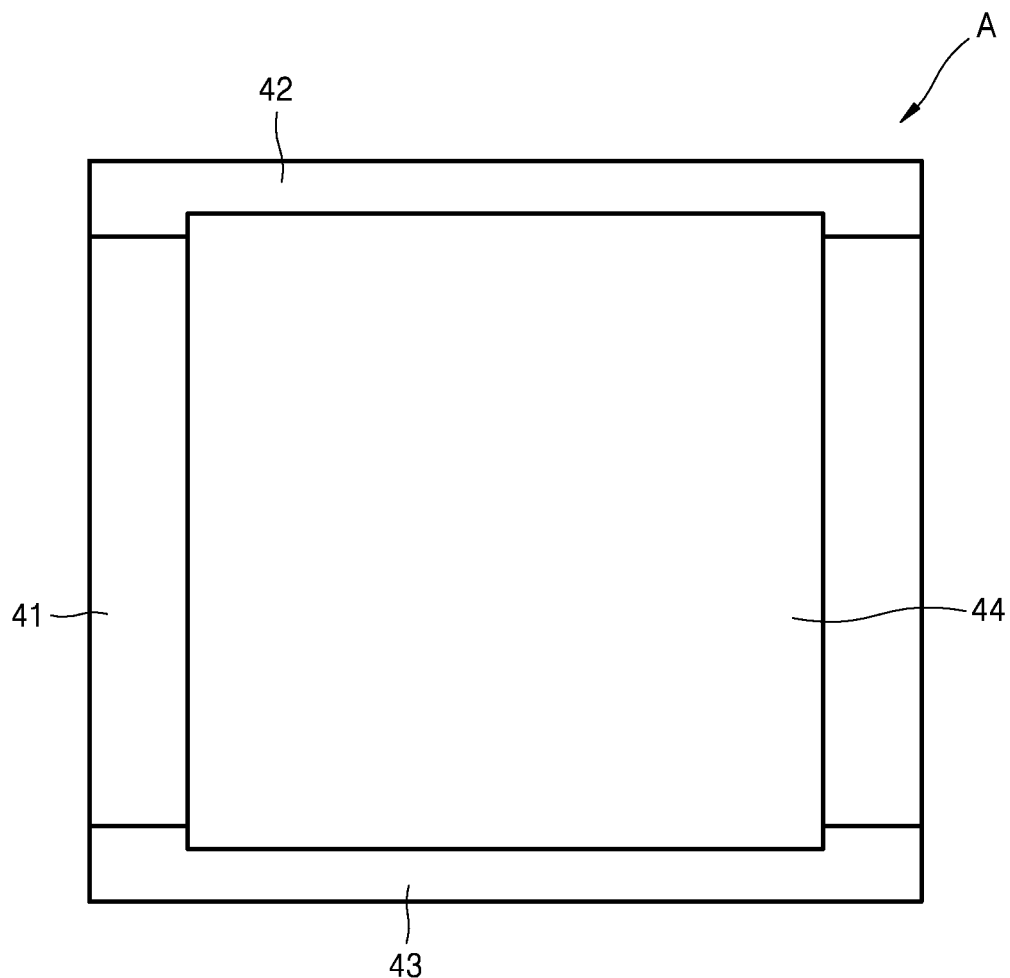
FIG. 4A is a schematic plan view of a planar heating element of a planar heating apparatus of FIG. 3 according to an example embodiment.
Figure 4B:
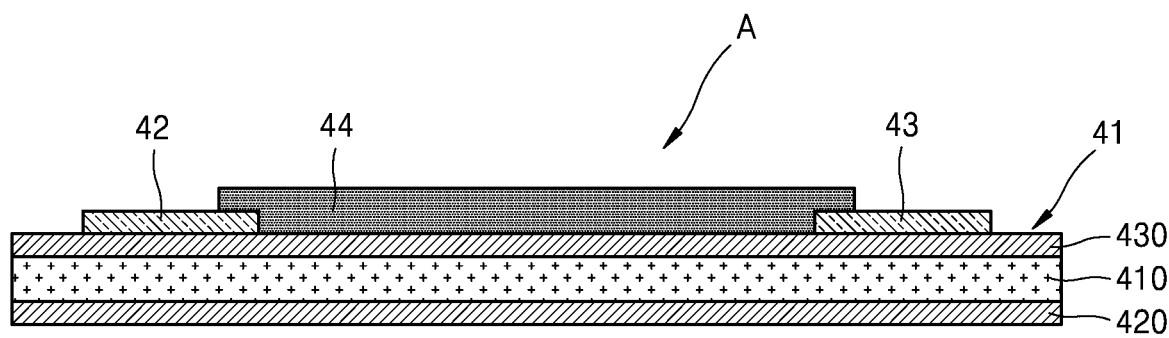
FIG. 4B is a cross-sectional view of the planar heating element of the planar heating apparatus of FIG. 3 according to an example embodiment.

FIG. 3 is a perspective view of a surface of a plate which forms a cavity of an electric oven according to an example embodiment. FIG. 4A is a schematic plan view of a planar heating element of a planar heating apparatus of FIG. 3 according to an example embodiment. FIG. 4B is a cross-sectional view of the planar heating element of the planar heating apparatus of FIG. 3 according to an example embodiment.

Referring to FIG. 3, the planar heating apparatus 40 according to an example embodiment may have a planar shape extending along one plane or planar surface. FIG. 4A is a top plan view of the planar heating apparatus 40 disposed in a plane defined in first (horizontal) and second (vertical) directions. FIG. 4B is a view taken in a third direction crossing both the first and second directions. The planar heating apparatus 40 may include a planar heating element A provided in plurality on a plate (refer to 21, 22, 23 and 24 of FIGS. 1 and 2) of the electric oven 1.

The planar heating apparatus 40 collectively includes a substrate 41, a first electrode 42, a second electrode 43, and one or more of a heating layer 44, a first connector 47 and a second connector 48. Referring to FIGS. 3, 4A and 4B, a single planar heating element A may include a portion of the substrate 41, a portion of the first electrode 42, a portion of the second electrode 43 and the heating layer 44.

The substrate 41 may be common to each of a plurality of planar heating elements A according to an example embodiment. The substrate 41 may have a planar shape disposed in a plane in which the first electrode 42, the second electrode 43 and the heating layer 44 are arranged. In this regard, the substrate 41 may be defined by a surface of the cavity 20, for example, a surface of any one of the top plate 21, the bottom plate 22, the two side plates 23 and the rear plate 24.

Referring to FIG. 4B, for example, when the substrate 41 is provided by a surface of the cavity 20, the substrate 41 may collectively include a second substrate 420 and a third substrate 430 which together surround a first substrate 410 arranged at a center portion of the overall substrate 41. In an exemplary embodiment, for example, a structure of the first substrate 410 may be implemented as a support substrate including a metallic material which supports other layers thereon. The second substrate 420 and the third substrate 430 may each include a plastic material such as enamel to form an enamel substrate surrounding the first substrate 410. However, the present disclosure is not limited thereto. In another exemplary embodiment, the first substrate 410 may include a material which defines an overall shape of the cavity 20 to support the cavity 20, the second substrate 420 may include the enamel material forming a surface at an inside of the cavity 20, and the third substrate 430 may include an insulating material to insulate layers of the substrate 41 from the first electrode 42 and the second electrode 43 thereon.

In the cross-sectional view of FIG. 4B, the first electrode 42 and the second electrode 43 may be arranged on an upper portion of the substrate 41, such as at a side of the substrate 41 opposite to that of the cavity 20. More specifically, the first electrode 42 and the second electrode 43 may be arranged on an upper portion of the third substrate 430 including the insulating material to be directly in contact with the substrate 41. The first electrode 42 and the second electrode 43 may include a material having excellent electric conductivity. In an exemplary embodiment, for example, the first electrode 42 and the second electrode 43 may include at least one of silver (Ag), aluminum (Al), indium tin oxide (ITO), copper (Cu), molybdenum (Mo) and platinum (Pt).

The first electrode 42 may be collectively formed by one or more of a first electrode portion on the substrate 41. In an exemplary embodiment, for example, as shown in FIG. 3, each first electrode portion defines a length thereof extended in a first direction. Plural first electrode portions are each connected to a common first electrode connection portion having a length which extends in a second direction crossing the first direction. When the first electrode 42 is collectively provided as a plurality of first electrode portions connected to a common first electrode connection portion, the plurality of first electrode portions may be spaced apart from each in the second direction other by a certain distance.

Also, the second electrode 43 may be collectively formed by one or more second electrode portion on the substrate 41. In an exemplary embodiment, for example, as shown in FIG. 3, each second electrode portion defines a length thereof extended in the first direction. Plural second electrode portions are each connected to a common second electrode connection portion having a length which extends in the second direction crossing the first direction. When the second electrode 43 is collectively provided as a plurality of second electrode portions connected to a common second electrode connection portion, the plurality of second electrode portions may be spaced apart from each other in the second direction by a certain distance. In this regard, the first electrode portions and the second electrode portions may alternate with each other in the second direction to be disposed in one to one correspondence. The electrode portions described may otherwise be referred to simply as "electrodes" such that a collection of electrodes may form an electrode member.

The heating layer 44 may be provided on the substrate 41. A same heating layer 44 may be in contact with each of the first electrode 42 and the second electrode 43. Referring to FIG. 3, the heating layer 44 may be disposed in plural to contact a same first electrode portion and a same second electrode portion in one to one correspondence with the first electrode portion. Referring again to FIGS. 3, 4A and 4B, a single planar heating element A may include a portion of the substrate 41, portions of a first electrode portion and a second electrode portion, and a heating layer 44 connected thereto.

The heating layer 44 may include an inorganic complex material including an inorganic material and an inorganic conducive material. In an exemplary embodiment, for example, the heating layer 44 may include carbon nanotubes ("CNT"s), for example, any one of single-wall CNT, double-wall CNT, multi-wall CNT, and twisted CNT, or a combination of at least two thereof. The heating layer 44 may include a conductive oxide film. The conductive oxide film may include at least one of $RuO_2$, $MnO_2$, $VO_2$, $TaO_2$, $IrO_2$, $NbO_2$, $WO_2$, $GaO_2$, $MoO_2$, $InO_2$, $CrO_2$, and $RhO_2$, or any combination thereof, but the present disclosure is not limited thereto.

Also, for a plurality of planar heating elements A, the plurality of heating layers 44 thereof may be spaced apart from each other on the substrate 41. In an exemplary embodiment, for example, as shown in FIG. 3, when the first electrode 42 and the second electrode 43 are provided as a plurality of first electrode portions and a plurality of second electrode portions, a plurality of heating layers 44 may be between a same one first electrode portion and second electrode portion and arranged along lengths thereof (e.g., in the first direction). In this regard, the plurality of heating layers 44 may be spaced apart from each other along the second direction by a certain distance. The plurality of heating layers 44 may be spaced apart from each other together with the same ones of the first and second electrode portions, may collectively define a grid shape that forms a plurality of columns according to an arrangement shape of the electrode portions of the first electrode 42 and the second electrode 43.

When the plurality of planar heating elements A are arranged outside the cavity 20, a relatively high temperature heat may be applied to the planar heating apparatus 40 including the first connector 47 and the second connector 48. With the relatively high temperature, the first connector 47 and the second connector 48 which respectively connect the electrodes 42 and 43 included in the planar heating apparatus 40 to a power supply 70 may be damaged. Arrangements and structures of the connectors 47 and 48 according to the invention which are capable of reducing or effectively preventing damage thereto from heat generated from the plurality of planar heating elements A will be described in more detail below.

Figure 5:
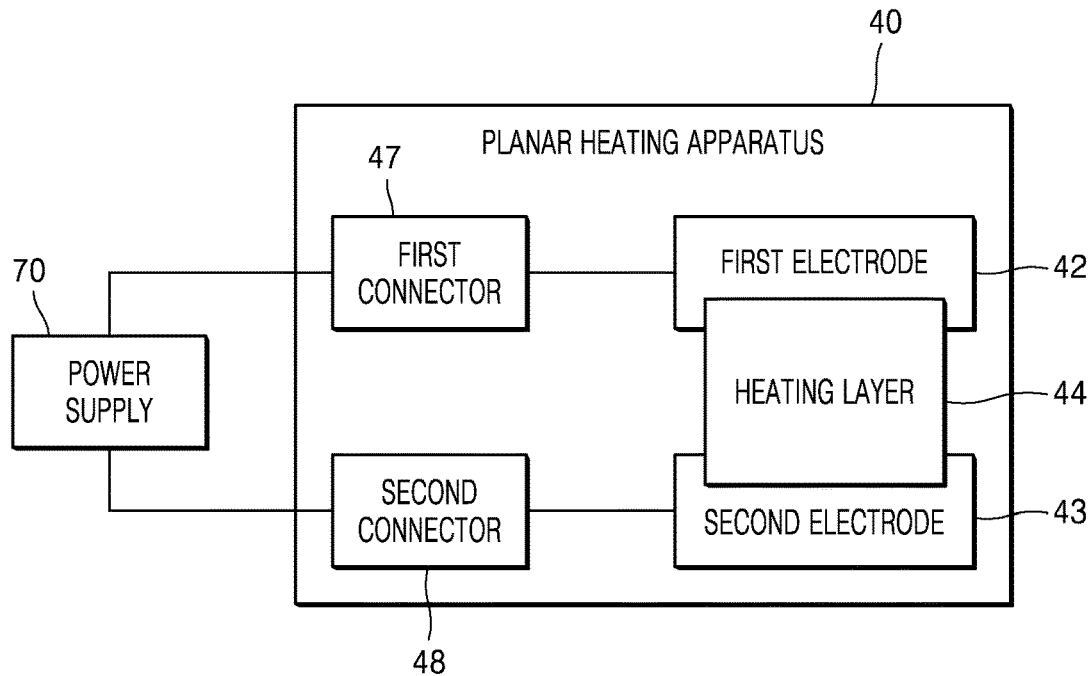
FIG. 5 is a block diagram of a power supply and a planar heating apparatus, according to an example embodiment.
Figure 6:
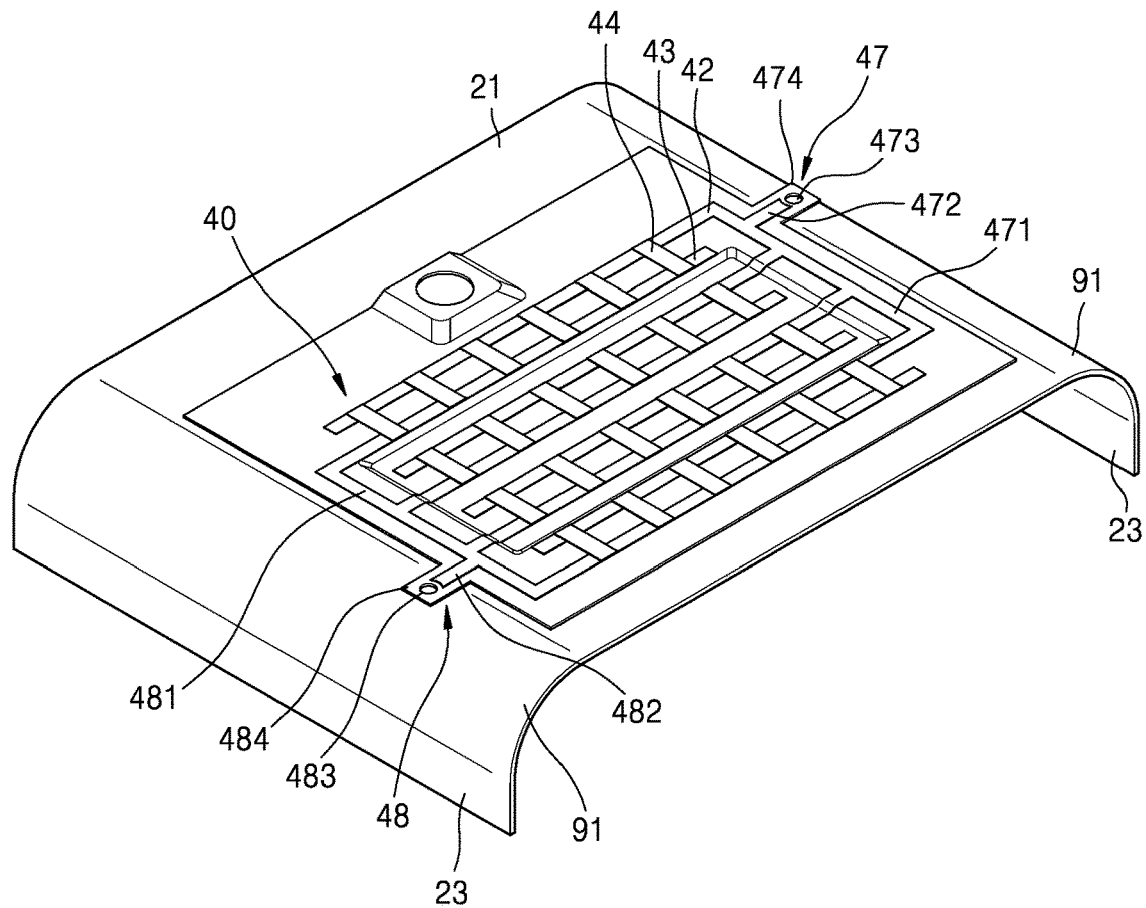
FIG. 6 is a partial perspective view of a planar heating apparatus relative to a cavity of an electric oven according to an example embodiment.

FIG. 5 is a block diagram of a connection between a power supply 70 and the planar heating apparatus 40, according to an example embodiment. FIG. 6 is a partial perspective view of the planar heating apparatus 40 relative to the cavity 20 according to an example embodiment.

Referring to FIGS. 5 and 6, the planar heating apparatus 40 may be connected to the power supply 70 through the connectors 47 and 48, thereby applying voltages provided by the power supply 70 to the first electrode 42 and the second electrode 43. In an exemplary embodiment, for example, the planar heating apparatus 40 may include the first connector 47 connected to the first electrode 42 and the second connector 48 connected to the second electrode 43. The first connector 47 and the second connector 48 may each be connected to the power supply 70 which is common to both connectors. Under application of the voltages to the electrodes 42 and 43, the heating layers 44 may generate heat such that the planar heating element described above generates heat. As such, the planar heating apparatus 40 including such planar heating element thereby generates heat so as to be heated at a relatively high temperature such as a temperature of about 600° C. With the planar heating apparatus 40 generating heat, such planar heating apparatus 40 disposed on a cavity-defining plate radiantly applies the generated heat to the cavity 20.

For example, as shown in FIG. 6, when the first electrode 42 is provided as a plurality of first electrode portions and the plurality of first electrode portions are spaced apart from each other, the first connector 47 which connects the plurality of first electrode portions and the power supply 70 to each other includes a first electrode connector 471 commonly connected to the plurality of first electrode portions, and a first power connector 472 connected to the first electrode connector 471 and extending outside the substrate 41.

The first electrode connector 471 may define a length which extends in one direction (e.g., the second direction) in order to connect the plurality of first electrode portions to each other. In this regard, the first electrode connector 471 may be arranged to connect one end portion of each of the plurality of first electrode portions of the first electrode 42 to each other. Also, in this regard, the first electrode connector 471 may include the same material as that of the plurality of first electrode portions of the first electrode 42, for example, at least one of Ag, Al, ITO, Cu, Mo, and Pt. The first electrode connector 471 may be integrally formed with the plurality of first electrode portions of the first electrode 42 to form a single, unitary first electrode member. However, the present disclosure is not limited thereto. If the first electrode connector 471 electrically connects the plurality of first electrode portions of the first electrode 42 to each other, the first electrode connector 471 may different materials from that of the first electrode 42 and may be separately formed from the first electrode 42.

A first end portion of the first power connector 472 may be connected to the first electrode connector 471 and a second (distal) end portion opposite to the first end portion thereof may lengthwise extend to be disposed outside the substrate 41 of the planar heating apparatus 40. As shown in FIG. 6, for example, the top plate 21 is respectively connected to the side plates 23 by a connector 91. The connector 91 may be disposed in different planes than those of the top plate 21 and side plates 23. Where the top plate 21 or the side plate 23 represents the substrate 41 of the planar heating apparatus 40, the substrate 41 does not include the connector 91. The cavity 20 of FIG. 6 is shown at a lower portion bounded by the side plates 23 and the top plate 21, where the planar heating apparatus 40 is disposed on a side of the top plate 21 opposite to that of the cavity 20.

Referring to FIG. 6, the second end portion of the first power connector 472 may be arranged on the connector 91 which does not define the substrate 41 of the planar heating apparatus 40. Accordingly, the first power connector 472 may be disposed outside the substrate 41 so that a relatively small amount of heat is applied to the first power connector 472.

The first power connector 472 may include the same material as that of the first electrode connector 471 and/or the plurality of first electrode portions of the first electrode 42, for example, at least one of Ag, Al, ITO, Cu, Mo, and Pt. The first power connector 472 may be integrally formed with the first electrode connector 471 and the first electrode 42 or may be integrally formed with only the first electrode connector 471, to form a single, unitary first electrode member. However, the present disclosure is not limited thereto. If the first power connector 472 is electrically connected to the first electrode connector 471, the first power connector 472 may include different materials from that of the first electrode connector 471 and the plurality of first electrode portions of the first electrode 42 and may be separately formed from the first electrode connector 471 and first electrode 42.

Also, for example, as shown in FIG. 6, when the second electrode 43 is provided as a plurality of first electrode portions and the plurality of second electrode portions are spaced apart from each other, the second connector 48 which connects the plurality of second electrode portions and the power supply 70 to each other includes a second electrode connector 481 commonly connected to the plurality of second electrode portions, and a second power connector 482 connected to the second electrode connector 481 and extending outside the substrate 41. Relative arrangement relationships and forming methods of the plurality of second electrode portions of the second electrode 43, the second electrode connector 481 and the second power connector 482 are substantially the same as those of the plurality of first electrode portions of the first electrode 42, the first electrode connector 471 and the first power connector 472 described above, and thus descriptions thereof are not repeated here for convenience of description.

Figure 7:
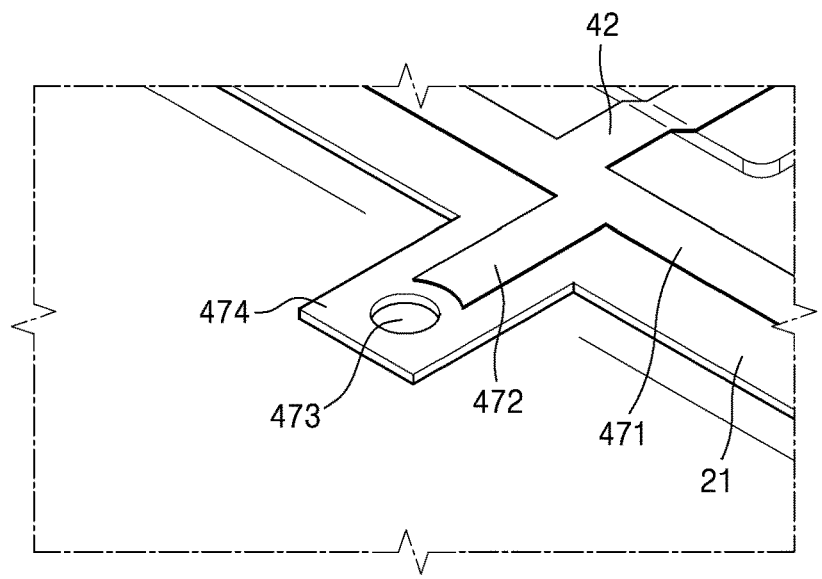
FIG. 7 is a perspective view of a first connector of a planar heating apparatus according to an example embodiment.
Figure 8:
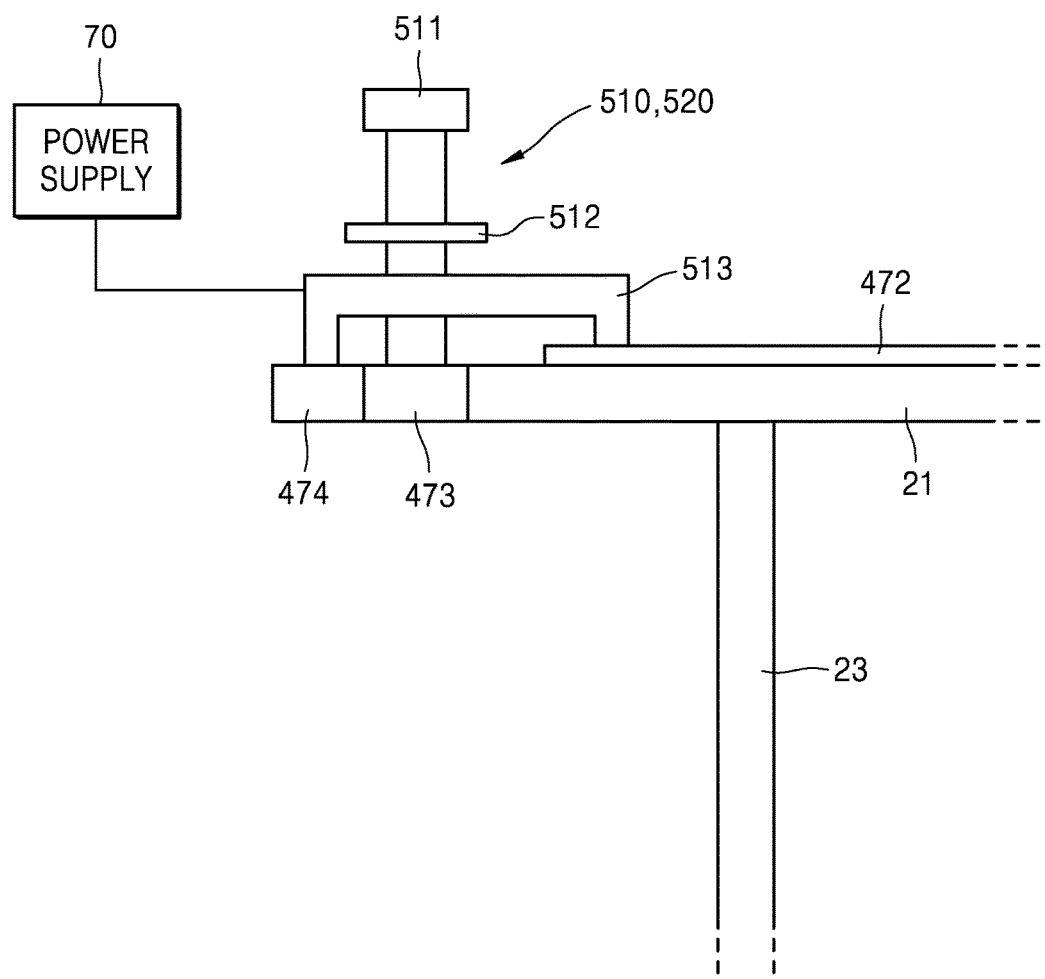
FIG. 8 is a schematic view for describing connection relationships between a pin connector and the first connector of the planar heating apparatus, according to an example embodiment.

FIG. 7 is a perspective view of the first connector 47 according to an example embodiment. FIG. 8 is a schematic view for describing respective connection relationships between pin connectors 510 and 520 and connectors 47 and 48, according to an example embodiment. A connection relationship of the first connector 47 and the first pin connector 510 and a connection relationship of the second connector 48 and the second pin connector 520 are substantially the same, and thus the first connector 47 and the first pin connector 510 will be described below.

Referring to FIGS. 7 and 8, the first connector 47 according to an example embodiment may include the first power connector 472 and the first electrode connector 471 which connects the first power connector to the first electrode 42. In this regard, the first power connector 472 may be supported by a separate supporter extending further than a surface which defines the cavity 20, for example, a surface provided by the top plate 21. In an exemplary embodiment, for example, the supporter may include a first support bracket 474 on which the first power connector 472 is supported by being disposed at a lower portion of the first power connector 472.

Similarly, with reference to FIG. 6, the second power connector 472 may be supported by a separate supporter extending further than a surface which defines the cavity 20, for example, a surface provided by the top plate 21. In an exemplary embodiment, for example, the supporter may include a second support bracket 484 on which the second power connector 482 is supported by being disposed at a lower portion of the second power connector 482.

An edge or boundary of a plate (refer to 21-24 in FIG. 1) may define a reference from which the supporter further extends. For example, the plate (21-24) in FIG. 3 includes a main portion having a rectilinear shape to define the surface on which the planar heating apparatus 40 is disposed, and the support brackets (474 and 484 in FIG. 6) lengthwise extend from the main portion to extend further than the surface of the plate. In FIG. 6, the plate 21 defines the surface on which the planar heating apparatus 40 is disposed while the connector 91 does not define the surface. Since the support brackets 474 and 484 in FIG. 6 lengthwise extend from top plate 21 to overlap the connector 91, the support brackets 474 and 484 extend further than the surface of the plate. In FIG. 8, the plate 21 includes a main portion ending at the side plate 23 to define the surface on which the planar heating apparatus 40 is disposed, and the support bracket 474 lengthwise extends from the main portion to extend further than the surface of the plate 21.

Referring to FIGS. 3, 7 and 8, for example, the first support bracket 474 may be integrally formed with a plate that forms the cavity 20. A main portion or surface of the plate on which the planar heating apparatus 40 is disposed may extend to define the first support bracket 474 outside the top plate 21 (e.g., as representing the substrate 41), as shown in FIGS. 3, 7 and 8. In this regard, the first support bracket 474 may include the same material as that of the top plate 21. However, the present disclosure is not limited thereto. When the first support bracket 474 includes an insulating material insulted from the first power connector 472 in one surface in which the first power connector 472 is arranged, the first support bracket 474 may not include an enamel material in another surface. A same structure may be applied for the second support bracket 484, and thus descriptions thereof are not repeated here.

Referring to FIG. 6, for example, the first support bracket 474 may be a member which is separately formed from the plate which forms the cavity 20 such that the separate member is fixed to a surface of the plate which forms the cavity 20, for example, at one side portion of the top plate 21. In FIG. 6, for example, even as being a portion of member separate from the top plate 21, the first support bracket 474 extends further than the top plate 21 to be disposed at the connector 91 outside the top plate 21. A same structure may be applied for the second support bracket 484, and thus descriptions thereof are not repeated here.

A first through hole 473 into which the first pin connector 510 is inserted may be arranged at a distal end portion of the first support bracket 474. In this regard, the second (distal) end portion of the first power connector 472 may spaced apart from the first through hole 473 by a certain distance. Accordingly, an unnecessary electrical connection between an inner wall surface of the first through hole 473 and the first power connector 472 may be reduced or effectively prevented. A same structure including a second through hole 483 may be applied for the second support bracket 484, and thus descriptions thereof are not repeated here.

Referring to FIG. 8, the first pin connector 510 according to an example embodiment may connect the power supply 70 and the first power connector 472 to each other. In an exemplary embodiment, for example, the first pin connector 510 may include a first bolt 511 lengthwise extending in one (e.g., the third direction) direction and inserted into the first through hole 473, a first bridge 513 connecting the first power connector 472 and the power supply 70 to each other, and an insulating layer 512 arranged between the first bolt 511 and the first bridge 513. The first bolt 511 may be detachably fastened to the first through hole 473, and thus a process of assembling or repairing the power supply 70 and/or the first power connector 472 may be more easily performed.

Also, the first bridge 513 in a shape of 'C' may be arranged in a lower portion of the first bolt 511. Thus, as shown in FIG. 7, the first power connector 472 that does not extend to the first through hole 473 may be easily connected to the power supply 70 and simultaneously, an unnecessary electrical connection between the first through hole 473 and the first power connector 472 may be reduced or effectively prevented.

The second pin connector 520 may have substantially the same structure as the first pin connector 510, for example, a second bolt, an insulating layer and a second bridge. A structure connecting the power supply 70 and the second power connector 482 to each other by using the second pin connector 520 may be substantially the same as a structure connecting the power supply 70 and the first power connector 472 to each other by using the first pin connector 510, and thus descriptions thereof are not repeated here.

However, the present disclosure is not limited to a pin connector structure including a through hole and a bridge. Any connector structure electrically connecting the first power connector 472 and the power supply 70 to each other where such elements are arranged away from a surface of a plate which forms the cavity 20, for example, the top plate 21 and the side plates 23, may be possible.

The planar heating apparatus according to one or more example embodiment may include connectors arranged outside a substrate of such planar heating apparatus, thereby connecting a power supply and an electrode included in the planar heating apparatus to each other without any damage of the connectors.

Also, an electric oven may employ the above-described planar heating apparatus as an electric heater. Thus the planar heating apparatus in such electric oven may be more easily arranged outside a cavity thereof, thereby relatively freely modifying a shape of the cavity and securing an electrical insulting property between the cavity and the electric heater.

It should be understood that embodiments described herein should be considered in a descriptive sense only and not for purposes of limitation. Descriptions of features within each embodiment should typically be considered as available for other similar features in other embodiments.

While one or more embodiments have been described with reference to the figures, it will be understood by those of ordinary skill in the art that various changes in form and details may be made therein without departing from the spirit and scope as defined by the following claims.

What is claimed is:

1. A planar heating apparatus comprising:
   a substrate;
   a plurality of first electrodes arranged on the substrate and spaced apart from each other;
   a plurality of second electrodes arranged on the substrate and spaced apart from each to alternate with the plurality of first electrodes;
   a plurality of heating layers arranged on the substrate respectively between a first electrode and a second electrode;
   a first connector on the substrate, comprising:
      a first electrode connector commonly connecting an end portion of each of the plurality of first electrodes to each other, and
      a first power connector connected to the first electrode connector and to which a power is applied, the first power connector extending outside the substrate to define a first power connector extension;
   a second connector on the substrate, comprising:
      a second electrode connector commonly connecting an end portion of each of the plurality of second electrodes to each other, and
      a second power connector connected to the second electrode connector and to which the power is applied, the second power connector extending outside the substrate to define a second power connector extension;
   a first support bracket connected to the substrate and on which the first power connector is disposed, such first support bracket extending outside the substrate to define a first support bracket extension;
   a second support bracket connected to the substrate and on which the second power connector is disposed, such second support bracket extending outside the substrate to define a second support bracket extension;
   a first through hole disposed at a distal end portion of the first support bracket extension; and
   a second through hole disposed at a distal end portion of the second support bracket extension
   wherein
   the first through hole is disposed between the distal end portion of the first support bracket extension and a distal end portion of the first power connector extension; and
   the second through hold is disposed between the distal end portion of the second support bracket extension and a distal end portion of the second power connector extension.

2. The planar heating apparatus of claim 1, wherein the plurality of heating layers comprise one of a carbon nano tube and a conductive oxide layer, the conductive oxide layer comprising at least one of $RuO_2$, $MnO_2$, $VO_2$, $TaO_2$, $IrO_2$, $NbO_2$, $WO_2$, $GaO_2$, $MoO_2$, $InO_2$, $CrO_2$ and $RhO_2$.

3. The planar heating apparatus of claim 1, wherein the plurality of first electrodes, the first electrode connector and the first power connector are integrally formed.

4. The planar heating apparatus of claim 1, wherein the plurality of second electrodes, the second electrode connector and the second power connector are integrally formed.

5. The planar heating apparatus of claim 1, wherein the power from the first and second power connectors generates heat in the plurality of heating layers to heat the planar heating apparatus at a temperature of about 600° C.

* * * * *